May 11, 1965

H. KOLETSKY ET AL 3,182,498

AIRCRAFT TAKEOFF MONITOR

Filed March 10, 1959

INVENTOR.
ALBERT L. DeGRAFFENRIED
HAROLD KOLETSKY
BY
Leonard H. King

INVENTOR.
ALBERT L. DeGRAFFENRIED
HAROLD KOLETSKY
BY
Leonard H. King

May 11, 1965   H. KOLETSKY ETAL   3,182,498
AIRCRAFT TAKEOFF MONITOR
Filed March 10, 1959   3 Sheets-Sheet 3

*INVENTOR.*
ALBERT L. DeGRAFFENRIED
HAROLD KOLETSKY
BY

*Leonard H. King*

United States Patent Office 3,182,498
Patented May 11, 1965

3,182,498
AIRCRAFT TAKEOFF MONITOR
Harold Koletsky, Syosset, and Albert L. de Graffenried, Douglaston, N.Y., assignors to Avien, Inc., Woodside, N.Y.
Filed Mar. 10, 1959, Ser. No. 798,425
2 Claims. (Cl. 73—178)

This invention relates to aircraft take-off monitors and in particular to a simple and reliable system suitable for measuring and indicating the take-off performance of an aircraft. It is intended to assist the pilot in effecting safe takeoffs under operating and runway conditions encountered in military or commercial service.

The need for instrumentation to aid the pilot in effecting a take-off has become increasingly evident since the introduction of the jet powered aircraft. The application of jet aircraft to commercial transport operations, where passenger safety is a paramount consideration, and the high rate of accidents in military operations has emphasized the requirement for a monitor system that would augment pilot judgment in evaluating takeoff performance and in making the necessary decisions to accomplish a safe takeoff on the available runway.

The possibility of an engine failure during takeoff influences takeoff procedures and is considered in all takeoff planning. With an engine failure, the pilot must be able to either stop or takeoff safely. Consideration is also made in the takeoff planning procedures for subnormal acceleration occurring for reasons other than engine failure.

For a better understanding and to avoid ambiguity, there are defined hereinafter technical terms common to aircraft operations.

The "Critical Field Length" is defined as the length of runway required for an airplane to accelerate to a particular speed with all engines operating normally and at that speed be able to stop by the end of the runway or in the same remaining distance takeoff with one engine not operating. The available runway length should be equal to or longer than the critical field length.

Critical field length charts are provided in standard handbooks and operational manuals for each aircraft which take into account the effects of airplane gross weight, pressure, altitude, outside air temperature, and wet or dry runway conditions.

"Takeoff-Distance" is defined as the actual length of runway used from the start of the ground roll until the airplane becomes airborne. Takeoff distance charts are provided in the usual operating manual for various combinations of gross weight, pressure, altitude and air temperature.

"Refusal-Speed" is defined as the highest speed to which the airplane can be accelerated and still be stopped on the runway. When the rules for critical field length are observed, a takeoff on five engines will always be possible for a six-engine aircraft, if an engine failure occurs at or above the refusal speed. In the case where actual runway length is equal to the critical field length, a five-engine takeoff may be made in the same distance as is required to stop from refusal speed. Refusal speed charts are available which take into account gross weight, pressure, altitude, and actual runway length.

"Refusal-Distance" is defined as the distance required to accelerate to refusal speed when acceleration is normal. Refusal distance may be obtained from standard aircraft speed and distance charts.

The "Decision-Point" is a point on the runway reached before the refusal distance is traversed. In order to compensate for the time lag resulting from human reaction time and equipment response time, a point on the runway, short of the refusal distance is selected. At this point designated the "decision-point" the pilot must decide on the course of action to pursue and to act accordingly.

The refusal-speed which approximates the desired ground-speed at the decision-point may be selected bearing in mind that "desired velocity" to be set-in the instrument may differ slightly from the refusal speed as determined from standard charts not allowing for the difference between the refusal-distance and the decision-point distance.

Military experience has demonstrated that even with highly experienced pilots, the jet takeoff may be subject to pilot error. In addition to the need for evaluating such factors as thrust, acceleration and distance against gross weight, runway conditions, wind, pressure altitude and temperature (as with propeller driven planes), the particular characteristics of the jet takeoff impose severe demands for precise pilot judgment. Analysis of the takeoff problem has shown that some of the principal factors leading to pilot error during takeoff are:

(a) The low noise and vibration associated with jet aircraft fail to provide auditory and kinesthetic cues for evaluating takeoff performance.

(b) There are wide differences in takeoff performance in any given type of aircraft because of variations in operational weight, and variations in thrust with altitude and temperature.

(c) The long ground roll and high takeoff speeds characteristic of many jet aircraft provides little margin between the required takeoff distance and available runway.

(b) The flat speed-thrust characteristic of the jet aircraft requires that the takeoff speed be selected with great accuracy and occur at exactly the correct position on the runway to assure both adequate lift and safe clearance of off-field obstacles.

Recognition of these factors by the military operating agencies had led to the establishment of takeoff procedures involving the use of runway distance markers, and either a one or a two-point comparison of speed versus distance during takeoff. When it is considered that for a typical fighter aircraft the time interval between the acceleration check distance and the refusal distance may be as little as 1.8 seconds, the deficiencies of these procedures become apparent. Moreover, the use of runway markers burdens the pilot's visual capabilities and compels him to divert his attention from the runway and from his instrument panel during critical moments of the takeoff. Experience has shown also that these procedures are of doubtful utility at night or under other conditions of poor visibility.

Past attempts to develop instrumentation to assist the pilot in evaluating takeoff performance have been based upon determination of power plant performance, or have attempted to superimpose additional functions, such as an indication of elapsed time, upon the airspeed indicator. These systems have shared common deficiencies in that they failed to reflect the critical factors affecting takeoff, or they unduly complicated primary flight instrumentation.

Accordingly, there is disclosed hereinafter a simple Go/No-Go indication that tells the pilot whether or not takeoff is proceeding normally, and if it is not, to advise him in time to effect a safe stop on the available runway. Operation of the system involves the measurement of only one variable . . . the distance over which the aircraft has travelled along the runway. This measurement is performed automatically and continuously during takeoff by means of a single sensor. In addition to its accuracy, simplicity and reliability, the system provides the following features:

(a) It is applicable to all types of aircraft, for any takeoff conditions.

(b) Use of the system for any takeoff requires insertion of only two bits of data, obtained by the pilot or dispatcher from standard flight handbooks as part of the presently employed flight preparation routine.

(c) Only one operating control is employed.

(d) Operation of the system is based upon logic almost identical to the pilot monitoring technique presently used, thus minimizing pilot familiarization time and effort.

(e) Operation is independent of other instrumentation and requires no cross-referencing of readings or reference to outside distance markers.

(f) Operation of the system is controlled by the pilot, and is not dependent upon aerodynamic or other auxiliary actuation.

(g) An important feature of this invention is that it can be retrofitted into operational aircraft without the need for major aircraft modifications and without degrading existing instrument displays.

Briefly stated, the takeoff monitor disclosed is essentially a speed and distance comparator that, (a) Continuously measures the distance over which the aircraft has travelled along the runway, (b) Continuously computes the ground speed of the aircraft during the takeoff run, (c) Compares the ground speed with any preselected distance with the normally expected speed for the particular aircraft and takeoff conditions, and (d) Indicates normal or subnormal performance at that distance by means of a "Go" or "No-Go" signal.

For its operation, the speed and distance references are pre-calculated by the pilot or dispatcher from handbook data and set into the system prior to each takeoff. By utilizing pre-calculated reference values the need for complex computer circuitry is avoided, and maximum simplicity and reliability are achieved.

Still other features and objects of this invention will be in part obvious and in part pointed out with particularity as the following description proceeds.

System components

Figure 1:
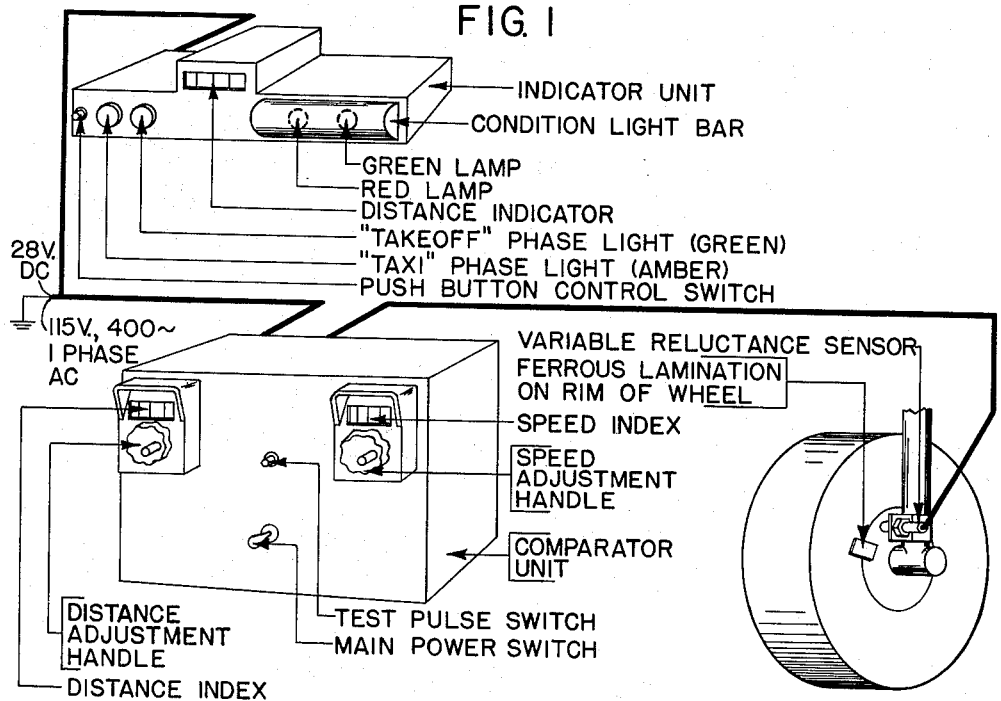
FIGURE 1 is a pictorial representation of the system comprising indicator and control means, a sensing element positioned in operating relationship to an aircraft wheel shown attached to a landing gear, and a high permeability strip of magnetic material mounted on the wheel.

The basic design of the takeoff monitor is shown in the elementary system diagram of FIGURE 1. As is shown in the diagram the system consists of three basic units;

(a) *Wheel revolution sensor.*—This is a miniature pulse generator weighing less than two ounces, which mounts on the landing gear structure and provides the basic distance signal by sensing wheel revolutions. The unit develops a voltage pulse each time a small ferrous armature, mounted on the wheel rim, passes the sensor's sensitive face. As a result, wheel revolutions are sensed without the necessity for any mechanical contact or linkage with the wheel.

(b) *Comparator unit.*—All measurement circuitry, with the exception of the sensor, is contained in this unit, which is mounted at any convenient location in the crew's compartment. The unit includes manually adjusted controls for setting in the decision distance and speed, in feet and knots, respectively. The set-in values are visible on a digital index over each of the adjustment knobs.

(c) *Indicator unit.*—This is essentially an illuminated bar which provides the Go/No-Go signal. Depending upon takeoff performance, the bar may be illuminated green (for "Go") or red (for "No-Go"). The unit also includes a digital register which provides the pilot with a continuous indication of the distance over which the aircraft has progressed along the runway.

Principles of operation

Figure 2:
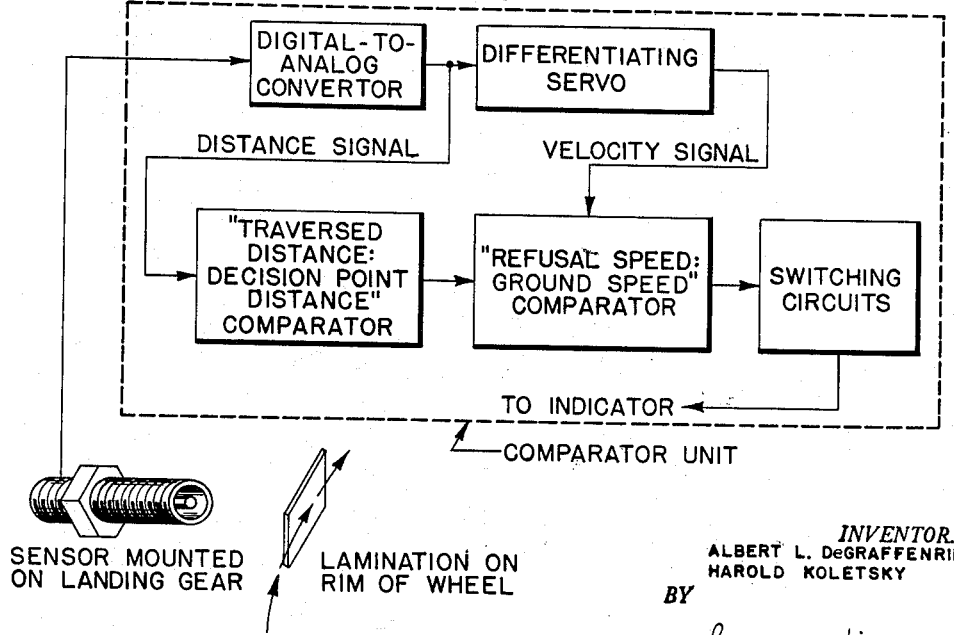
FIGURE 2 is a system block diagram.
Figure 3:
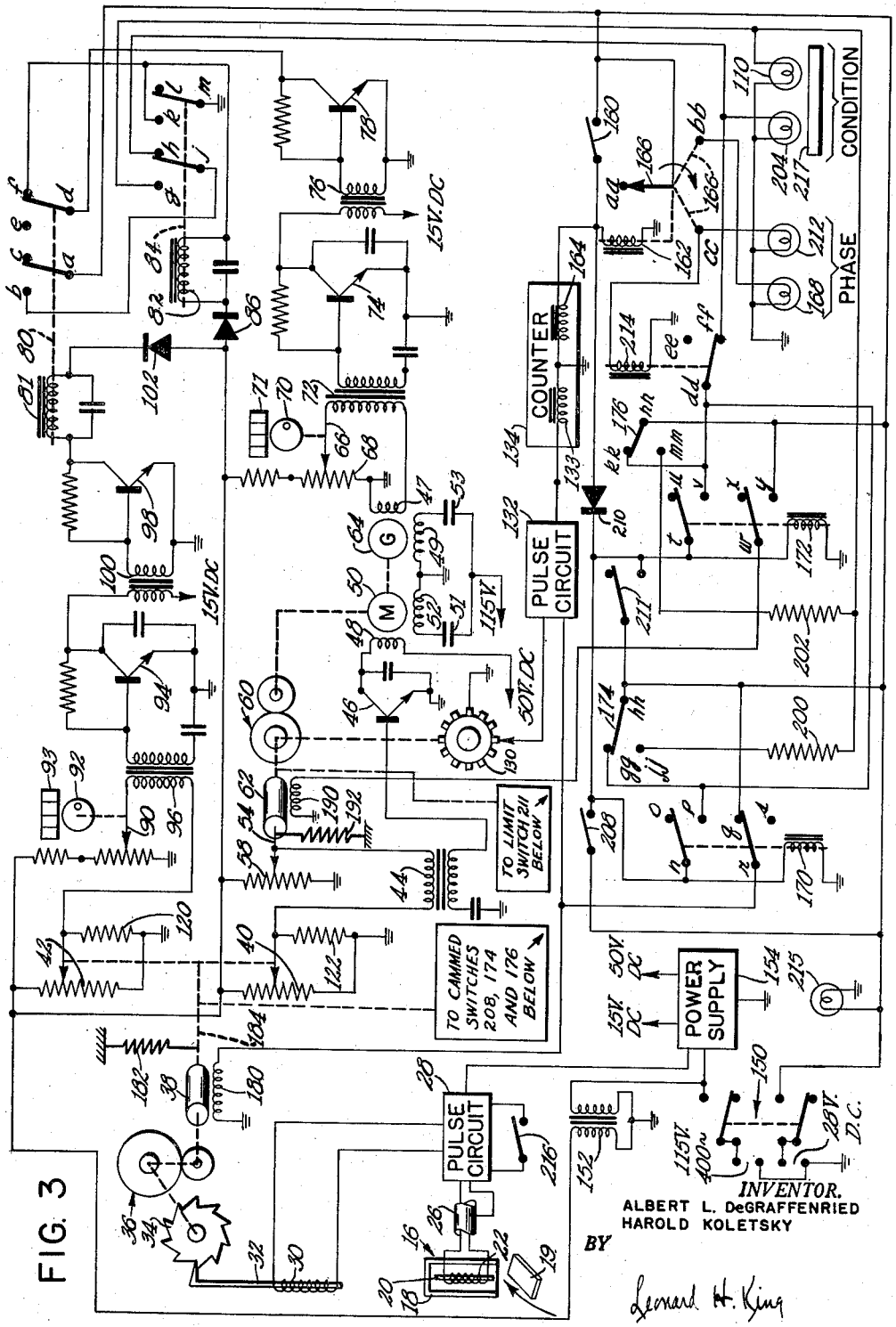
FIGURE 3 is a circuit diagram of the system.

Operation of the system can be seen from the block diagram of FIGURE 2. Measurement of the distance over which the aircraft has progressed along the runway is accomplished by converting wheel revolutions into short voltage pulses generated by a ferrous lamination passing a variable reluctance sensor and counting these pulses continuously during the takeoff run. These voltage pulses are used to actuate a digital-to-analog converter to provide a voltage which at any moment during the takeoff run, is proportional to the distance travelled by the aircraft along the runway. This distance voltage is continuously compared with a reference voltage, representing distance to the decision point, which is set into the system by the pilot prior to takeoff.

The ground speed of the aircraft is determined by differentiating the distance-travelled voltage with respect to time by means of a position servo and tachometer generator. This "speed" voltage is compared with a second reference voltage, representing Go/No-Go speed also precomputed and set into the comparator before takeoff.

In operation, when the distance voltage derived from the total number of wheel pulses equals the voltage representing the decision point distance, a relay closes, applying voltage to an indicating lamp. If at the time the decision point distance is reached the aircraft has attained the required speed, appropriate circuits will already have been closed and a green "Go" signal will appear on the indicator. If the speed of the aircraft at the decision point is below its required Go/No-Go velocity, appropriate circuits will energize the light on the indicator. Optionally, an interruptor may be used to periodically open the lamp circuit to provide a flashing signal.

Design of the system, and particularly its arrangement of interlocking switches, is such that a "Go" indication can be obtained only when the decision point distance has been reached and aircraft speed is equal to or greater than the speed required at that point. Avoidance of intermediate indications during the takeoff run eliminates ambiguity and the need for pilot interpretations.

Electrical and mechanical design

Electrical and mechanical design of the disclosed takeoff monitor has been directed toward simplicity, reliability, and ease of application to all types of military and commercial aircraft. The use of a single sensor for determining both distance and velocity contributes to the simplicity and reliability of the system, and eliminates the necessity of tapping into pitot-static lines. Except for the armature, the sensor employs no moving parts and requires no external excitation, thus providing high service reliability and permitting connection to the comparator by means of a single shielded wire. The electrical characteristics of the sensor have been specified to assure an adequate level of pulse voltages over any range of wheel revolution rates encountered in practical operations.

For displaying the Go/No-Go signal, the indicator uses a semi-cylindrical light bar, fabricated of polymethyl methacrylate and surface-etched to ensure uniform highly diffuse illumination. This design provides good visibility through near-peripheral vision and permits location of the indicator outside the pilot's line of sight, where it cannot obstruct his vision during takeoff or in flight.

To permit application of the system to all types of aircraft, without the need for matched units, the comparator incorporates calibration adjustments for different wheel diameters, and for lift-induced variations in rolling radius during takeoff. These are screwdriver adjustments, which need be made only once, at initial installation of the system. Where the system is to be installed in a number of aircraft of the same type, calibration can be made at the factory from wheel and lift data, eliminating the need for installation adjustments.

Operating power of the system is nominal 28 volts D.C. and 115 volts, 400 cycles, single phase A.C. normally available aboard aircraft. All connections between units are made through standard AN connectors.

Signal displays

The signal displays and function controls of the takeoff monitor have been designed to ensure compatibility with practical operational procedures and to eliminate any possibility of ambiguity in use, while maintaining maximum operating simplicity. The indicator presents three types of information:
(a) Operating phase.
(b) Operating condition in each phase.
(c) Distance travelled.

The indicator display and manner of presentation are shown in FIGURE 1.

Phase indication

To enable the pilot to use the system during both taxi and takeoff without introducing errors into the takeoff distance measurement, operation of the system is sequenced into separate "taxi" and "takeoff" phases. Two circular lights, interlocked with the system's control switch indicate the operating phase of the system. An amber light informs the pilot when the system is in the "taxi" phase, while a green light signals when the system has been prepared for "takeof" operation.

Condition indication

In addition to providing the "Go" or "No-Go" signal during takeoff, an elongated illuminatable member termed the "condition light bar" indicates whether or not the system is properly zeroed before taxi and takeoff. A green illumination of the bar indicates correct zero condition of the measurement circuits, while a red signal warns the pilot when it is necessary to re-zero the system before attempting takeoff. The action of the light bar illuminating means is interlocked with the control switch and phase lights to insure correct sequencing of condition signals and Go/No-Go indications for takeoff.

Distance register

A digital counter on the indicator panel provides a continuous indication of distance travelled during the takeoff run and may be used to enable the pilot to anticipate his approach to the Go/No-Go point. This register will also indicate "taxi" distance, enabling the pilot to check the operation of the system before starting the takeoff run.

The register has been designed to indicate distance in increments of 100 feet using dummy zeros as the last two digits of the counter. This design avoids the distraction that would result from rapidly rotating counter wheels, while providing the precision of indication necessary for practical takeoff operations.

Function controls

The controls and input data indices of the takeoff monitor are shown in FIGURE 1. A single push-button switch mounted on the panel of the indicator controls the operation of the system. All other controls are mounted on the comparator unit. These are the main power switches, the distance index, the ground-speed index, and the test pulse switch.

Control switch

The operating control is a push-button switch which selects the desired operating phase, and at the same time adjusts the circuit for correct operation in that phase. The switch is connected so that each successive depression brings the system to the next phase in the taxi-takeoff operating cycle. By depressing the control switch once, twice or three times, the pilot may, as desired, place the system into the taxi phase, the takeoff phase, or reset it to "Off" in preparation for the next cycle.

The pilot or maintenance personnel can also use the control switch to cycle the system before takeoff as a pre-flight check of its operation.

Input data indices

The distance set-in means is a 10-turn potentiometer, covering the range 0–10,000 feet in increments of 10 feet. The value of the set-in data is visible as a digital display through a cutout over the index knob.

The speed index is a three-turn potentiometer which may be adjusted in increments of 1 knot over the range 50 to 150 knots. The set-in values are displayed on a counter similar to that used with the distance index.

Both these potentiometers incorporate snap type shaft locks which insure positive indexing under all conditions of vibration and acceleration encountered in takeoff.

Test pulse switch

A test pulse switch is incorporated in the comparator to permit pre-flight testing of the measurement circuits. Successive on-off actuation of this switch simulates the operation of the wheel revolution sensor during the taxi or takeoff roll, and enables pilot or maintenance crew to check the operation of the distance register without the need for moving the aircraft.

Main power switch

A toggle switch on the comparator controls all power to the system, making the operation of the takeoff monitor independent of other instrument systems.

In the following section there is disclosed the currently preferred circuit for effectuating the operations discussed heretofore.

Circuit

Variable reluctance sensing device 16 consists of a magnetizable cup-shaped core 18 (shown schematically as U-shaped) coaxially enclosing a bar magnet 20. A coil 22 surrounds magnet 20. As a small ferrous armature 19 attached to the aircraft wheel passes the magnet 20 and core 18 generates a positive pulse and a negative pulse in the coil 22, a coaxial cable 26 couples sensing device 16 to pulse circuit 28. The function of pulse circuit 28 is to amplify the signal from the sensing device 16, and provide a pulse of a suitable energy level. The amplified signal is used to energize relay coil 30. It is necessary that the pulse have a duration or pulse length sufficient to fully actuate armature 32. In general, the pulse circuit should provide a pulse length of from 30 to 40 milliseconds and about 6 watts of power. The output pulse from the pulse circuit 28 is fed to relay coil 30, which actuates an armature which engages a 10-tooth star wheel escapement 34. Ten pulses will result in one revolution of the star wheel escapement 34. In turn, the star wheel 34 is geared through a 80 to 1 reduction gear train 36 through electromagnetic clutch 38 to a pair of single-turn potentiometers 40 and 42. It will be appreciated that a digital-to-analog conversion has just been described whereby the numerical value of the pulses is converted to an electrical voltage that is an analog of this numerical value. Potentiometer 40 is part of a velocity sensing circuit. As the aircraft progresses down the runway, the wiper of potentiometer 40 advances gradually providing a signal of increasing magnitude to comparison transformer 44. The output of the transformer is fed to transistor amplifier stage 46, which amplifies the error signal output of transformer 44 and feeds it to one winding 48 of motor 50. The other winding 52 is energized from 115 v.-400 cycle A.C. source. Capacitor 51 in series with winding 52 serves as a phase shifting capacitor.

The error signal causes motor 50 to drive the wiper 54 of rebalance potentiometer 58 in a direction tending to produce a correction voltage of the proper magnitude to reduce the error signal. Potentiometer wiper 54 is driven through gear train 60 coupled to motor 50 and electromagnetic clutch 62.

There is also provided, as part of the aforementioned voltage differentiating means, discussed hereinabove in Principles of Operation a rate generator 64 which provides a signal indicative of the velocity of the aircraft. Rate generator 64 is coupled to motor 50. As the velocity of the aircraft increases, the speed of rotation of motor 50 increases in order to maintain rebalance potentiometer 58 in step with the change produced by the movement of the aircraft. Therefore, as the velocity of the aircraft increases the output voltage induced in output phase winding 47 of generator 64 will increase. The other phase winding 49 is energized from the 115 v. source through phase shifting capacitor 53. The output of the rate generator 64 is inserted in transformer 72 in phase opposition to a reference voltage obtained by varying the position of wiper 66 of potentiometer 68, which is connected to a source of A.C. potential. This reference voltage is set by adjusting the velocity setting by means of handle 70 located on the instrument panel until speed index 71 coupled to the shaft indicates a velocity corresponding to the velocity the aircraft should have at the decision point.

An error signal is produced which is the difference between the output of generator 64 and potentiometer 68. The error signal is amplified by transistor amplifier stage 74 and applied to transformer 76 which couples class A transistor amplifier 74 to a half wave phase sensitive amplifier stage 78 which has an A.C. potential applied to its collector. The phase relationship of the two signals is such that when the magnitude of the signal from generator 64 is greater than the signal provided by potentiometer 68, class B amplifier stage 78 will be conductive. Thus, when the velocity of the aircraft exceeds the set-in velocity, the full collector circuit will flow if a circuit exists to a source of power. Tracing the collector circuit, it will be seen that the collector is connected through contacts d–f of distance relay 80 (when relay coil 81 is energized) to coil 82 of velocity relay 84, and through diode rectifier 86 to the 36 v. A.C. supply.

*Distance circuit*

The output signal derived from potentiometer 42 advances gradually from a minimum value to a maximum value as the aircraft progresses down the runway. The signal is applied in phase opposition to a reference signal obtained from potentiometer 90. Potentiometer 90 provides a set-in voltage and is controlled by handle 92 on the instrument panel. This handle is turned until the distance index 93 geared to it shows a reading corresponding to the length of the runway from takeoff start point to the decision point.

An error signal corresponding to the difference in magnitude of the signal from potentiometers 42 and 90 is fed to class A transistor amplifier 94 through transformer 96. As the aircraft advances and reaches the decision point the signal from potentiometer 42 becomes greater than the set-in signal from potentiometer 90. As a result, the signal fed to the class A transistor amplifier 94 through transformer 96 is amplified. The resulting amplified error signal energizes the half wave phase sensitive transistor amplifier 98 through associated interstage coupling transformer 100, when the signal and applied collector voltage are in phase. When class B amplifier stage 98 is triggered, full collector current is permitted to flow through relay coil 81 and diode 102, which is connected to a nominal 36 volt A.C. source, so that half-wave rectified power is fed to relay 80 whenever transistor amplifier stage 98 is conducting.

The transformer connections must be such that the error signal from potentiometer 42 is in phase with the voltage applied to the collector of stage 98.

If the aircraft is proceeding with a velocity equal to or in excess of the set-in value, the transistor amplifier stage 78 is triggered so as to be in a conducting condition. In turn, velocity relay 84 is actuated, since the coil 82 is in the collector circuit of the transistor. Actuation of velocity relay 84 closes contacts k and m, thus "locking-in" the relay by permitting a steady current flow through an alternate path from the 36 v. A.C. source to ground. The alternate path does not include transistor amplifier 78. Simultaneously, connection is broken between contacts h and j and made between contact j and g. At such time as distance relay 80 is actuated, at the decision point, contact b of distance relay 80 is energized by 28 volt D.C. so as to energize contact g of velocity relay 84. This results in the energizing of the green "Go" takeoff condition light 110, signifying that the aircraft has sufficient ground speed at the decision point, for takeoff. The light 110 is energized through contacts j and g. If the aircraft has not achieved the set-in "Refusal Speed," red "No-Go" signal lamp 204 is energized through contacts j and h.

On the other hand, if the decision point is reached and the aircraft has not attained sufficient velocity, then the following cycle of events occur; distance relay 80 is actuated, thereby opening the connection from contact d to contact f, thus locking out velocity relay 84 from being energized so that even if the aircraft should attain the velocity required after passing the decision point, the pilot will not receive a green "Go" light or "takeoff" signal. This is an important safety feature of the disclosed invention. Simultaneously with the opening of the circuit to velocity relay 84, contact b of distance relay 80 is energized. This serves to energize terminal j of velocity relay 84 which, in the unenergized condition of velocity relay 84, is in contact with terminal h. This results in the energizing of the red "No-Go" indication.

As the aircraft proceeds down the runway, and the wing lift slowly increases, the rolling radius of the aircraft tire will vary in accordance with the remaining load on the tire. This results in a non-linear relationship between the number of pulse signals from the sensing unit 16 and the actual distance traversed. In some aircraft with a high angle of attack, such as a jet fighter, the aircraft's lift will cause an error of as much as 5% in measurement.

In order to compensate for this variation, a signal could be fed into the system related to the load of the aircraft on the landing gear. The signal may be derived from a strain gage or other transducer which measures this load continuously.

Another solution is to provide potentiometers 40 and 42 with a non-linear resistance characteristic curve.

In the present embodiment of the invention, it is preferred to accomplish this correction by use of loading resistors 120 and 122. These resistors are shunted across their respective potentiometers to produce a non-linear relationship between potentiometer output voltage and potentiometer rotation angle. This compensates for changes in rolling radius caused by lift (which varies with air-speed squared) which gradually removes weight from the aircraft's wheels. The padding of potentiometers is a well known technique and the procedure need not be described herein.

Therefore, it will be appreciated that the output rotation of gear train 60 has been rendered linear with respect to distance traversed. A mechanical output is derived from gear train 60 to drive a "distance-traversed" circuit.

A commutator 130 is coupled to the drive so that pulses generated by commutator 130 making and breaking a connection to ground are in electrical connection with a pulse circuit as an indication of distance actually traveled. The ground side of a pulse amplifier circuit 132 is fed to the commutator and, in turn, to ground so that as the commutator rotates, pulses are generated. The pulses are amplified in pulse circuit 132 and used to energize coil 133 so as to actuate a digital counter 134. The function of pulse circuit 132 is the same as that of pulse circuit 28 described earlier. The commutator contact spacing, gear train ratio, and indicator are selected to provide a change in indication every 100 feet; more frequent changes have been found to be distracting to the pilot.

*Operational use of the takeoff monitor*

The design of the takeoff monitor has been directed toward maximum operating simplicity with minimum pilot effort. Operation of the system is based upon logic almost identical to that of the visual monitoring techniques presently employed for jet aircraft takeoffs. Its simplicity of operation is reflected in:

(a) The use of only one operating control,
(b) the need to set in only two elements of data prior to takeoff,
(c) the use of conventional amber, green and red indications for signaling.

*Takeoff procedure*

Operation of the system is carried out in two phases: "taxi" and "takeoff."

(1) *Before taxiing.*—(a) The equipment is turned on by means of the main power toggle switch 150.

(b) The pilot sets the distance-to-decision point and the required speed at that distance on the respective indices 93 and 71.

(c) The pilot depresses the control switch 160 *once*.

The amber light goes on, indicating "taxi" phase. Simultaneously the distance register is cleared and the condition light bar 217 is illuminated green by lamp 110. This green condition light informs the pilot that the system is zeroed and prepared to measure distance during the taxi roll.

(2) *During taxiing.*—As the aircraft begins to taxi and the system begins to measure the taxi roll, the condition signal, light bar 217 will change from green (lamp 110) to red (lamp 204 energized). At the same time the distance register will start indicating the distance of the taxi roll. The red condition light will remain on, warning the pilot that the measurement circuits are no longer zeroed, until the system is reset for takeoff. The amber light also remains illuminated, indicating that the system is still in the "taxi" phase.

(3) *Takeoff position.*—When the pilot is ready to commence the takeoff run he depresses the control switch 160 again, turning off the amber "taxi" light 168 and illuminating the green "takeoff" light 212. This action again re-zeroes the measurement circuits and the distance register. Proper zeroing of the system is signaled by a green illumination of the condition light bar 217, indicating that the takeoff run may be started.

(4) *Takeoff.*—(a) As the aircraft starts the takeoff run the condition light is automatically extinguished, clearing the indicator for the "Go" or "No-Go" signal. At the same time the distance register starts indicating distance travelled. This indication continues as the plane progresses down the runway, permitting the pilot to anticipate his approach to the Go/No-Go point.

(b) If, when the aircraft reaches the indexed decision point distance, the ground speed is less than the indexed velocity, the condition light bar 217 will display a red "No-Go" signal.

(c) If the ground speed at the check distance is equal to or above the indexed value, the condition light bar will display a green "Go" signal, indicating that takeoff can be safely continued.

(5) *After takeoff.*—As soon as the aircraft is airborne and the climb established, the pilot may depress the control switch again, extinguishing all lights on the indicator. The system may later be shut off by means of the main power switch.

It will be noted that the amber, green, and red signals, respectively, are coordinated to provide an indication of both operational readiness and takeoff performance. The use of these three illuminating colors serves to avoid ambiguity or the need for interpretation. The use of the red bar, with its conventional acceptance as a warning signal, to indicate when the system is not zeroed, assures that the takeoff will not be attempted unless the system is properly cleared for the takeoff run.

The separation of the operating sequence into "taxi" and "takeoff" phases corresponds with accustomed procedures in takeoff operations, and in addition, provides the pilot with an opportunity to assure himself of the correct functioning of the equipment before the takeoff run. However, when desired (as for a "flying takeoff" such as used in some military operations) the taxi phase may be bypassed. Depressing the control switch twice will bring the system directly into the takeoff phase.

*Pre-flight check*

Pre-flight testing of the system is performed simply and rapidly by using the control switch and test pulse switch 216 to simulate actual operation of the system. The pilot or maintenance personnel may check the indicator lights and their correct sequencing by depressing the control switch a number of times. Proper functioning of the measurement circuits, the distance register, and the "No-Go" signal circuit can be determined by actuating the test pulse switch to simulate the pulse from the wheel revolution sensor.

Since it is not necessary to move the aircraft for this pre-flight check, the testing may be performed in the hanger or on the apron at any time before takeoff.

*Control and signal circuit operation*

The equipment is turned on by means of a main power double pole double throw toggle switch 150. Closing of the switch provides nominal 115 volt-400 cycle power and nominal 28 volt D.C. from the aircraft electrical system. Transformer 152 connected to the 115 volt-400 cycle supply provides 36 volt-400 cycle power, which is rectified by diodes 86 and 102 for use in relays 80 and 84, and also serves as the A.C. signal used in the self-balancing circuits. Power supply 154 is a conventional full-wave rectifier using solid-state diodes and RC filtering network and voltage dropping resistors to provide the different D.C. voltages for operation of the amplifiers.

Operation of the equipment is extremely simple. After the pilot has set the distance and speed on their respective indexes 93 and 71 by means of handles 92 and 70, he depresses control switch 160 once. Closing of control switch 160 energizes stepping relay 162, which is shown here as a three-step relay. A 12-step relay has been found satisfactory with every third contact connected in parallel so that it acts essentially as a three-step relay.

Simultaneously with the actuation of relay 162, re-set coil 164 of counter 134 is energized so as to clear the register contact arm 166 of relay 162 has been advanced from contact *aa* to contact *bb*, thereby energizing amber "taxi" lamp 168 to indicate that the equipment is now in the "taxi phase." Relays 170 and 172 are likewise energized by the closing of contact switch 160. Upon energization of relay 170, circuit is completed between contacts *n* and *p*, which completes a circuit from ground at relay 170 to 28 volts D.C. source through contact *gg* and *hh* of switch 174, thus providing lock-in of relay 170 until the main power switch 150 is opened so as to completely de-energize the system. The use of the lock-in relay is necessary because switch 160 provides merely a momentary contact. Relay 172 is likewise locked in by completion of the circuit from contact *t* to *v* through contacts *kk* and *nn* of switch 176.

Figure 4:
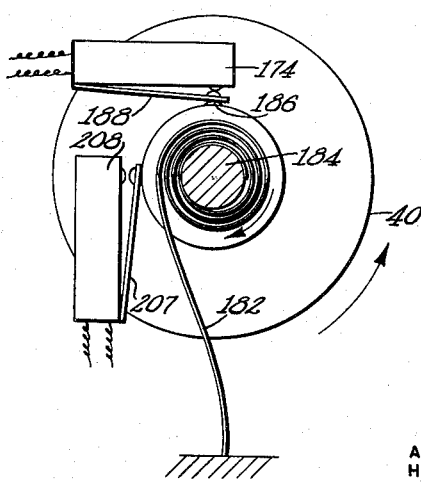
FIGURE 4 shows in elevation a potentiometer, associated potentiometer shaft position sensing switches, and a shaft position reset spring.

Actuation of relays 170 and 172 is intended to zero the system. Relay 170 opens the circuit from contacts *r* to *q*, thereby de-energizing coil 180 releasing clutch 38 from engagement. This permits a constant tension spring 182 to return potentiometers 40 and 42 to a zero position as shown in FIGURE 4.

Potentiometer 40 is provided with a shaft 184 to which is coupled spring 182. Upon de-energizing of coil 180, spring 182 returns the shaft to a starting position at which point a detent 186 (FIGURE 4) engages finger 188 of switch 174 so as to close the circuit between contacts hh and jj. In like fashion, actuation of relay 172 closes the circuit between contacts w and y. This energizes coil 190 of reverse acting clutch 62. This clutch is in a disengaged condition when energized. This action permits spring 192 to return wiper 54 of potentiometer 56 to a zero position wherein a detent closes the circuit between contacts nn and mm of switch 176. The arrangement of the detent is similar to that shown in FIGURE 4.

While one clutch coil has been described as de-energized and the other clutch coil as energized, for disengagement, it should be understood that the mechanical construction could be such that either can disengage when de-energized or when energized without departing from the principle of this invention.

With potentiometers 40 and 42, which are ganged on a common shaft, and potentiometer 56 reset to zero, the detents actuate switches 174 and 176. A circuit will be completed from 28 volt D.C. source through dropping resistors 200 and 202 to green light 110, if the potentiometers are zeroed. If either potentiometer is not returned to the zero position, their respective switch will not be actuated so as to complete a parallel circuit to green light 110. If only one switch has been closed, then a feeble green light will be observed because of the current limiting action of resistors 200 and 202. If both circuits are opened, the green light will be completely off.

If either switch 174 or 176 is not actuated by the detent, then a red light will appear since the circuit is completed through lamp 204.

This is an important safety feature to preclude the possibility of a failure of which the pilot is not aware. As the aircraft begins to taxi and the system begins to measure the taxi roll, the condition signal will change from green to red. The red condition light will remain on, warning the pilot that the measurement circuits are no longer zeroed, until the system is reset for takeoff.

In order to prevent continued counting by the counter 134 during the potentiometer reset operation, the circuit is arranged to de-energise the pulse circuit at time of reset. It will be noted that when relay 170 is closed terminal r is de-energized. Clutch coil 180 and pulse circuit are both energized at terminal r. Thus as reset of the potentiometer is taking place, the pulse circuit is not capable of producing pulses.

As the potentiometer rotates to the maximum intended rotation, say 330°, detent 186 engages finger 207 of switch 208 thereby closing switch 208 and relays 170 and 172 so as to reset the wipers of both potentiometers 40 and 42 to zero position. A limit switch 211 is similarly actuated by a detent on the shaft of potentiometer 58 to reset the wipers of both potentiometers 40 and 42 to zero position. Diode 210 blocks the pulse from acting on reset coil 164 so that even though the potentiometers have been reset to zero the counter will indicate the total distance traversed.

When the pilot is ready to commence the takeoff run, he once again depresses the control switch 160. This moves contact arm 166 from position bb to cc. This completes the circuit to green light 212 indicating that the equipment is in takeoff phase condition and extinguishes amber lamp 168. The actuation of momentary contact switch 160 energizes all the circuits as previously described in connection with the taxi position. An additional relay is actuated in the takeoff position. This is relay 214 which opens the circuit between contacts dd and ff. This prevents a red lamp 204 from being energized through the action of switch 174 or 176 because the potentiometer wipers are not in zero position, so that in the takeoff phase the only red light appearing is a "No-Go" signal.

Figure 5:
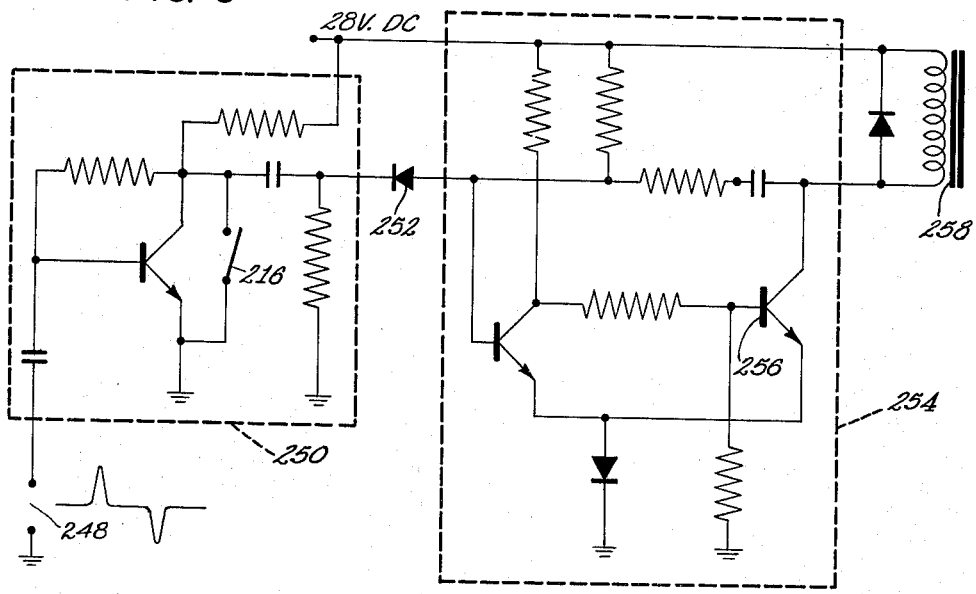
FIGURE 5 is a circuit diagram of a typical pulse amplifying and stretching circuit.

The pulse provided by the variable reluctance sensing unit 16 is in the form of positive and negative wave shapes. A typical pulse is shown at the input terminals 248 of amplifier 250 (FIGURE 5). The amplifier is a conventional class B transistor amplifier biased to amplify only the positive portion of the pulse.

The amplified output from amplifier 250 is rectified by diode 252 so as to remove the positive pulse and locks out spurious noise. The negative pulse triggers a one-shot multivibrator 254 which produces an output pulse having a duration of about 35 milliseconds. The output pulse width is independent of the trigger pulse width, provided the trigger pulse is narrower.

The output pulse permits the collector circuit of transistor 256 to be conductive so that coil 258 is energized long enough to complete actuation. The pulse circuit shown may be used as a pulse circuit 29 or as pulse circuit 132 with relay coil 258 corresponding to coil 30 or 133, respectively.

Switch 216 is used to generate a pulse for test of the equipment. For the counter circuit as employed in the pulse circuit 132, the test switch may be omitted.

The pulse circuit may take other forms. For example, the positive portion of the incoming pulse may be used to actuate a flip-flop circuit and the negative peak of the pulse may be used to de-energize the flip-flop circuit. Many other pulse forming circuits are known to the art and may be substituted for the pulse circuit shown. The particular relay employed may require a variation in pulse length but such circuit changes are well within the scope of persons engaged in the electronics art and need not be described more fully herein.

What is claimed is:

1. In combination with an aircraft provided with rotatable supporting wheels, means carried by said aircraft for producing pulses; the number of said pulses being directly related to the number of revolutions made by said wheels and therefore to the distance traversed by said wheels, a potentiometer network, means responsive to said pulses for varying the said potentiometer network to provide a first signal voltage proportional to the distance traversed by said aircraft during take-off roll, voltage differentiating means deriving a second signal voltage from said first signal voltage, said second signal voltage being proportional to the ground speed of said aircraft, means automatically comparing said first signal voltage with a voltage representative of the distance between the start of a takeoff roll and the decision point for safe takeoff for said aircraft, said distance-comparing means adapted to provide a first condition signal only if said first voltage signal exceeds said distance-representing voltage, means comparing said second signal voltage with voltage indicative of a minimum desired ground speed at the said decision point, said speed-comparing means adapted to provide a second condition signal only if said second signal voltage exceeds said speed-representing voltage, first indicating means actuated by both said first and second condition signals for indicating that said aircraft has achieved the minimum desired ground speed prior to passing the descision point and second indicating means alternatively actuated by both said first and second condition signals for indicating that said aircraft has not achieved said minimum desired ground speed prior to passing said decision point, said potentiometer network having compensation means adapted to correct for variations of the aircraft tire rolling radius due to the lift of the aircraft as it becomes airborne, said compensation means comprising resistance adjustment means adapted to give said potentiometer network a non-linear characteristic, whereby relatively fewer pulses resulting from said airborne condition are adapted to provide an increased voltage output indicative of increased distance traversed down the runway.

2. An aircraft takeoff monitor comprising:
means to generate a first voltage analogous to the known distance from a starting point to a decision point for successful takeoff for an individual aircraft;
means to generate a second voltage analogous to the distance being traversed by said aircraft in course of a takeoff roll;
first comparator means connected to receive said first and second voltages and adapted to yield a first output signal upon exceeding of said first by said second voltage, said first comparator means adapted to yield a zero output upon non-exceeding of said first by said second voltage;
first relay means responsive to said first output signal;
means to generate a third voltage analogous to the known minimum ground speed required by said aircraft at said decision point for successful takeoff;
means connected to receive and adapted to differentiate said second voltage to thereby generate a fourth volt analogous to the ground speed of said aircraft in course of said takeoff roll;
second comparator means connected to receive said third and fourth voltages and adapted to yield a second output signal upon exceeding of said third by said fourth voltage, said second comparator means adapted to yield a zero output upon non-exceeding of said third by said fourth voltage;
second relay means responsive to said second output signal; and
a first visual signal indicating a "go" condition and a second visual signal indicating a "no go" condition;
said first and second relay means being interdependently interconnected whereby the condition of said first output signal occurring before said second output signal is adapted to energize said first relay to thereby actuate said "no go" signal, and also to disable said second relay whereby any subsequent increase in speed shall be ineffective to actuate said "go" signal, and the condition of said second output signal occurring before said first output signal is adapted to energize said second relay into co-operative connection to said first relay whereby upon the occurrence of said first output signal said "go" signal is actuated.

References Cited by the Examiner

UNITED STATES PATENTS

| | | | |
|---|---|---|---|
| 2,807,165 | 9/57 | Kuzyk et al. | 73—178 |
| 2,922,982 | 1/60 | Hoekstra | 33—178 X |
| 2,947,502 | 8/60 | Highley | 73—178 X |

OTHER REFERENCES

Snodgrass: "Take-Off Aids to Pilots," Skyways magazine, October 1957, pages 24, 89, 90 and 91.

Publication: "Takeoff-Monitors Compete for Market," Aviation Week magazine, July 28, 1958, pages 77, 78 and 79.

ROBERT B. HULL, *Primary Examiner.*

ISAAC LISANN, L. R. PRINCE, *Examiners.*